(12) United States Patent
Knopp et al.

(10) Patent No.: US 11,407,444 B2
(45) Date of Patent: Aug. 9, 2022

(54) ELECTROMECHANICAL MOTOR VEHICLE STEERING SYSTEM

(71) Applicant: VOLKSWAGEN AKTIENGESELLSCHAFT, Wolfsburg (DE)

(72) Inventors: Thomas Knopp, Vechelde (DE); Joachim Thies, Wolfenbuettel (DE); Klaas-Simon Jenke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 164 days.

(21) Appl. No.: 16/614,448

(22) PCT Filed: Apr. 6, 2018

(86) PCT No.: PCT/EP2018/058931
§ 371 (c)(1),
(2) Date: Nov. 18, 2019

(87) PCT Pub. No.: WO2018/210486
PCT Pub. Date: Nov. 22, 2018

(65) Prior Publication Data
US 2020/0198691 A1 Jun. 25, 2020

(30) Foreign Application Priority Data
May 16, 2017 (DE) .................... 10 2017 208 248.8

(51) Int. Cl.
*B62D 5/04* (2006.01)
*B62D 3/04* (2006.01)
*B62D 7/16* (2006.01)

(52) U.S. Cl.
CPC ............. *B62D 5/0427* (2013.01); *B62D 3/04* (2013.01); *B62D 7/16* (2013.01)

(58) Field of Classification Search
CPC .......... B62D 5/0427; B62D 3/04; B62D 7/16; B62D 5/0421; B62D 5/0424
See application file for complete search history.

(56) References Cited

U.S. PATENT DOCUMENTS

| 8,690,173 B2 | 4/2014 | Bilmayer et al. |
| 8,833,507 B2 | 9/2014 | Sekikawa et al. |

(Continued)

FOREIGN PATENT DOCUMENTS

| CN | 102649445 A | 8/2012 |
| CN | 103029747 A | 4/2013 |

(Continued)

OTHER PUBLICATIONS

English translation of JP2009120094 obtained from Espacenet.com (Year: 2009).*

*Primary Examiner* — Minnah L Seoh
*Assistant Examiner* — Harold Eric Pahlck, III
(74) *Attorney, Agent, or Firm* — Laurence A. Greenberg; Werner H. Stemer; Ralph E. Locher

(57) ABSTRACT

An electromechanical motor vehicle steering system includes a steering column, a steering rack, a steering pinion that couples the steering column to the steering rack, and an electric drive device with an electric motor and a worm wheel arranged on the steering pinion. The steering rack is arranged between the worm wheel of the electric drive device and the steering column.

13 Claims, 5 Drawing Sheets

(56) References Cited

U.S. PATENT DOCUMENTS

| | | | |
|---|---|---|---|
| 9,168,947 B2 * | 10/2015 | Shiino | B62D 5/0406 |
| 9,452,773 B2 | 9/2016 | Sato | |
| 9,643,476 B2 | 5/2017 | Lenterman | |
| 10,011,294 B2 * | 7/2018 | Okamoto | B62D 3/123 |
| 10,526,004 B2 | 1/2020 | Witte | |
| 11,046,357 B2 * | 6/2021 | Steck | B62D 5/0454 |
| 2005/0257991 A1 * | 11/2005 | Ishii | B62D 5/0421 |
| | | | 180/444 |
| 2006/0055139 A1 | 3/2006 | Furumi et al. | |
| 2012/0217085 A1 | 8/2012 | Sekikawa | |
| 2013/0180794 A1 | 7/2013 | Shiino et al. | |
| 2015/0298722 A1 | 10/2015 | Witte | |

FOREIGN PATENT DOCUMENTS

| | | | | |
|---|---|---|---|---|
| CN | 103204179 A | | 7/2013 | |
| CN | 104755357 A | | 7/2015 | |
| CN | 104818839 A | | 8/2015 | |
| CN | 104943739 A | | 9/2015 | |
| CN | 105936205 A | | 9/2016 | |
| DE | 19811784 A1 | | 9/1999 | |
| DE | 10142388 A1 | | 5/2002 | |
| DE | 60312350 T2 | | 7/2007 | |
| DE | 102007004218 A1 | | 9/2008 | |
| DE | 102009027468 A1 | | 1/2011 | |
| DE | 102012021436 A1 | | 4/2014 | |
| EP | 1545959 A1 | | 6/2005 | |
| EP | 2595854 A1 | | 5/2013 | |
| JP | 2009120094 | * | 6/2009 | B62D 3/12 |
| JP | 2009120094 A | | 6/2009 | |
| JP | 2015178295 A | | 10/2015 | |
| WO | 9947405 A1 | | 9/1999 | |

* cited by examiner

ELECTROMECHANICAL MOTOR VEHICLE STEERING SYSTEM

BACKGROUND OF THE INVENTION

Field of the Invention

The invention relates to an electromechanical motor vehicle steering system comprising a steering column, a steering rack, a steering pinion that couples the steering column to the steering rack, and an electric drive device with an electric motor and a worm wheel arranged on the steering pinion.

Electromechanical motor vehicle steering systems are becoming increasingly popular due to their fuel-saving potential. In this connection, a distinction must be made among the different ways of arranging the electric drive device.

In a first steering type, the drive torque of the electric drive device is introduced into the steering column (EPSc—"column"). However, in this case, the maximum drive torques are limited due to transmission via the steering column. Because the electric drive device, in this case, is usually located in the upper portion of the steering column, and thus close to the driver, particular challenges arise with regard to crash behavior.

A second option consists of placing the electric drive device directly on the steering pinion (EPSp—"pinion"). This allows higher steering performance than with an EPSc-type steering system. However, the package options are limited due to the arrangement of the electric drive device on the steering pinion, especially because a torque sensor is usually also arranged in this area. Such a steering system is described, for example, in EP 1 545 959 A1.

In a third steering type, the electric drive device is attached to a second pinion, which engages with the steering rack in addition to the steering pinion (EPSdp—"double pinion"). Two gear sections for the two pinions must be formed correspondingly on the steering rack, so that the effort is greater than for a EPSp-type steering system.

Instead of a second pinion, the force generated by the electric motor may be transmitted to the steering rack by a combination of a ball screw drive and a toothed belt drive (EPSapa—"axle parallel").

SUMMARY OF THE INVENTION

The purpose of the present invention is to improve an EPSp-type electromechanical motor vehicle steering system, in which the electric drive device engages directly with the steering pinion. In particular, the invention seeks to realize a more favorable package with such a steering system.

This goal is achieved by an electromechanical motor vehicle steering system with the features as claimed. The motor vehicle steering system according to the invention comprises a steering column, a steering rack, a steering pinion that couples the steering column to the steering rack, and an electric drive device with an electric motor and a worm wheel that is arranged on the steering pinion. It is characterized by the fact that the steering rack lies between the worm wheel of the electric drive device and the steering column.

This enables a more compact design and more flexible arrangement of the electric drive device.

Advantageous configurations of the invention are the subject matter of additional patent claims.

In one variant embodiment, the worm wheel is mounted overhung at one end section of the steering pinion, which facilitates the assembly thereof.

The steering pinion is preferably rotatably mounted in a steering housing by means of a first bearing and a second bearing; a gear section of the steering pinion, which engages with the steering rack, may be located between the two bearings. The bearing of the steering pinion therefore also serves to support the worm wheel.

In a variation of this, however, it is also possible that both the gear section of the steering pinion, which engages with the steering rack, and the worm wheel lie between these two bearings.

Furthermore, the electric drive device may have a worm shaft that is drive-coupled to the electric motor and engages with the worm wheel. In one embodiment, the rotation axis of the worm shaft and the rotation axis of the worm wheel enclose a intersection angle in the range of 20° to 80°.

The two rotation axes are of course skewed relative to each other. The intersection angle is defined as the angle enclosed by the direction vectors of the rotational axes.

An alternative variant embodiment envisions that the rotation axis of the worm shaft and the rotation axis of the worm wheel enclose a intersection angle of 90°.

For purposes of compact design, the electric drive device may have a single-stage transmission.

Preferably, for that purpose, the worm shaft is coaxial with the rotation axis of the electric motor. As a result, the worm shaft may be integrated into a motor output shaft if necessary.

Relative to the vertical direction, in the installed state of the motor vehicle steering system in a motor vehicle, the worm wheel may be arranged below the steering rack, thus avoiding installation space conflicts with a torque sensor at the interface between the steering pinion and the steering column.

The electric motor may also be arranged below the steering rack, relative to the vertical direction in the installed state of the motor vehicle steering system.

In a particular embodiment, the rotation axis of the electric motor may be parallel to the steering rack. It is also possible to arrange the electric motor, in its position in a plane below the steering rack, so that it is swiveled to the axis-parallel position.

In an additional embodiment, it is also possible to swivel the position of the rotation axis of the electric motor in a plane that cuts the steering pinion below the steering rack.

Further, the worm wheel may be fastened to the steering pinion as an independent component. This fastening may be positive or non-positive.

In the case of a non-positive connection between the worm wheel and the steering pinion, the connection may be configured so as to slip when a predetermined torque is exceeded, so as to provide overload protection.

The invention is explained in greater detail below, with reference to the exemplary embodiments shown in the drawings. The drawings show the following:

DESCRIPTION OF THE INVENTION

The exemplary embodiments, described in greater detail below, relate to an EPSp-type electromechanical motor vehicle steering system with an electric drive device that acts directly on the steering pinion.

Figure 1:
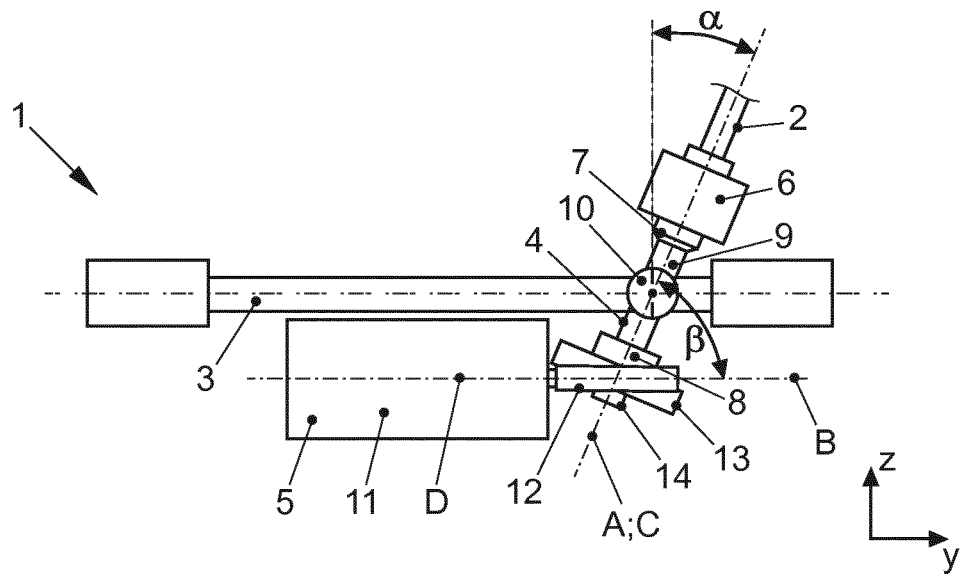
FIG. 1 Front view of a first exemplary embodiment of an electromechanical motor vehicle steering system according to the invention, FIG. 2 Spatial view of the first exemplary embodiment, FIG. 3 Second exemplary embodiment of an electromechanical motor vehicle steering system according to the invention, FIG. 4 First variant embodiment for a steering pinion with a worm wheel fastened to it.

FIG. 1 shows a first exemplary embodiment of such a steering system 1 with a steering column 2, a steering rack 3, a steering pinion 4 that couples the steering column 2 to the steering rack 3, and also an electric drive device 5, the drive torque of which is introduced into the steering system 1 at the steering pinion 4.

As for the steering column 2, only an intermediate shaft is shown, extending in the direction of a steering wheel not otherwise shown, to which the steering pinion 4 is connected. A torque measuring device 6 is arranged in the coupling area between the steering column 2 and the steering pinion 4.

The steering pinion 4 is rotatably mounted in a steering housing not otherwise shown in FIG. 1, via two bearings 7 and 8. The steering pinion 4 has a gear section 9 that engages with a toothing of the steering rack 3. FIG. 1 also shows a thrust piece 10 that presses the steering rack 3 against the gear section 9 of the steering pinion 4.

In the installed state in a motor vehicle, in a vertical plane yz defined by the transverse direction y of the vehicle and the vertical direction z, a rotation axis A of the steering pinion 4 encloses an angle α ranging from 0 to 40° with the vertical direction z. In a vertical plane xz defined by the longitudinal direction x of the vehicle and the vertical direction z, the rotation axis A with the vertical direction z encloses an angle in the range 0 to 60°.

The electric drive device 5 comprises an electric motor 11 and a gear stage downstream thereof, with a worm shaft 12 and a worm wheel 13.

The gear stage is preferably single-stage. In this case, the worm shaft 12 connects directly to the electric motor 11. In particular, the worm shaft may be integrated into a motor output shaft.

The worm shaft 12 may be coaxial with the rotation axis D of the electric motor 11.

The worm wheel 13 is arranged and fastened on the steering pinion 4.

Preferably, the rotation axis B of the worm shaft 12 and the rotation axis C of the worm wheel 13, which coincides with the rotation axis A of the steering pinion 4, enclose an intersection angle β in the range from 20° to 80°.

According to the invention, the worm wheel 13 is located on the side of the steering rack 3 that is opposite the steering column 2. The steering rack 3 is thus arranged between the worm wheel 13 of the electric drive device 5 and the steering column 2.

The arrangement of the electric drive device 5 is not affected by the torque measuring device 6. This increases the possibility of different positions of the electric drive device 5 relative to the steering rack 3. As a result, a compact configuration is achieved.

Figure 2:
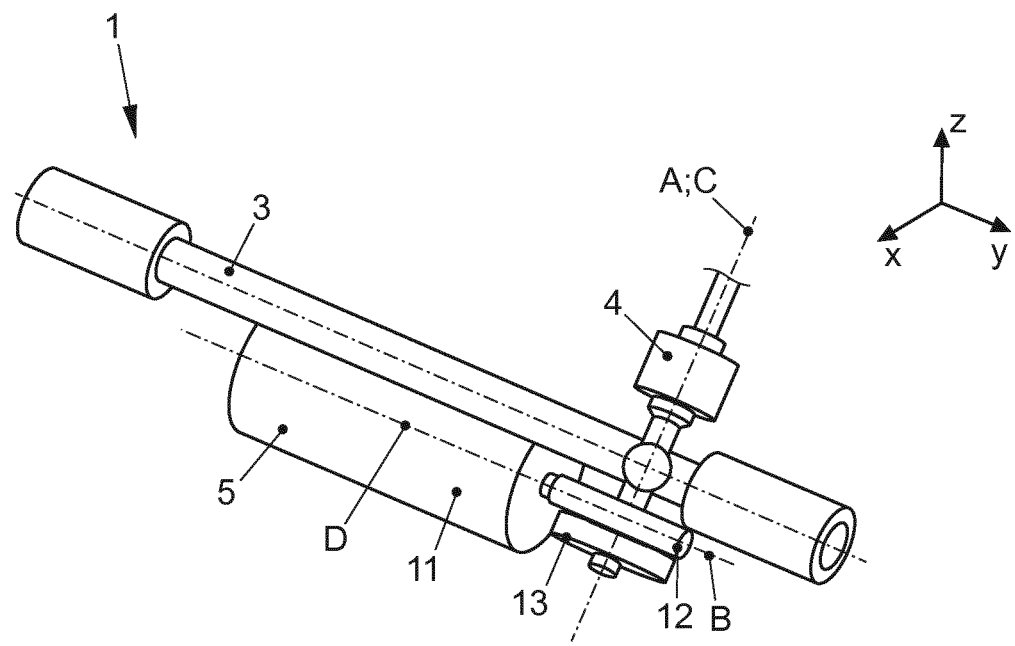

In the exemplary embodiment shown in FIGS. 1 and 2, the electric drive device 5, in the installed state, is arranged below the steering rack 3 in the vertical direction z.

In particular, the worm wheel 13 and preferably also the electric motor 11 may be arranged below the steering rack 3 in relation to the vertical direction. In addition, in the variant shown in FIGS. 1 and 2, the rotation axis D of the electric motor 11 is parallel to the steering rack 3. However, it is also possible to deviate from such an arrangement, as will be explained in greater detail below.

As mentioned above, the steering pinion 4 is mounted rotatably on two bearings 7 and 8. These two bearings 7 and 8 simultaneously support the toothing forces of the gear stage, so that no additional bearing is required for the worm wheel 13.

In particular, the worm wheel 13 may be mounted overhung at an end section 14 of the steering pinion 4, the second bearing 8 being located between the gear section 9 and the end section 14 of the steering pinion 4 to which the worm wheel 13 is fastened. The gear section 9 of the steering pinion 4 is located between the two bearings 7 and 8.

Figure 3:
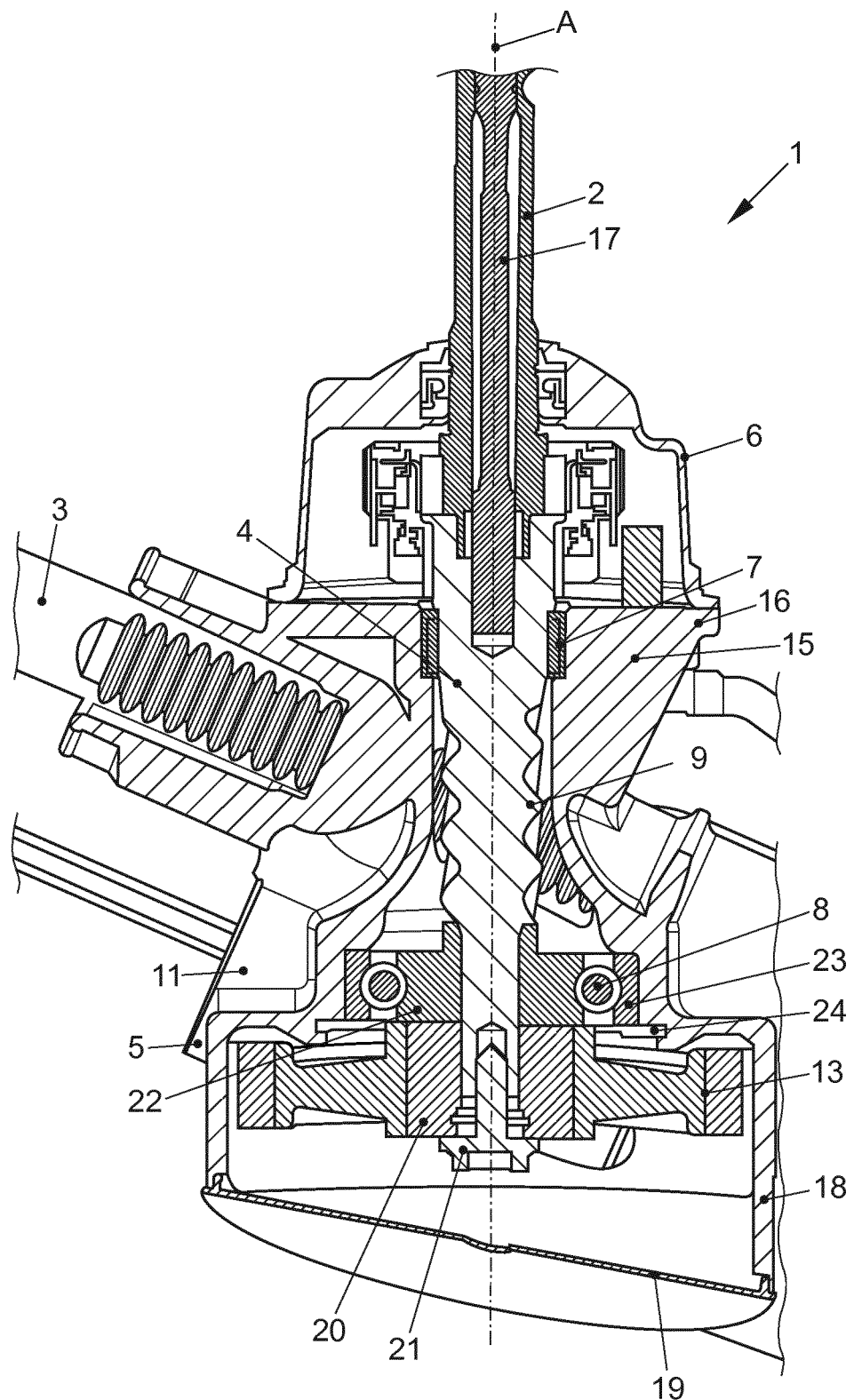

An example of a structural implementation is shown in FIG. 3 with reference to a second exemplary embodiment. The components that correspond to the first exemplary embodiment are furnished with the same reference symbols.

In particular, FIG. 3 additionally shows a steering housing 15 in which the steering pinion 4 is supported via a first bearing 7, for example in the form of a needle bearing, and a second bearing 8, for example in the form of a ball bearing.

The steering housing 15 forms a flange 16 on the input side to support the torque measuring device 6, into which the steering column 2 extends with an intermediate shaft and is coupled to the steering pinion 4 by means of a torsion bar 17.

The electric drive device 5 engages the end section 14 of the steering pinion 4 opposite the steering column 2. For that purpose, the worm wheel 13 is fastened to this free end section 14. Accordingly, the steering housing 15 forms a cup-shaped receptacle 18 for the worm wheel 13 on the side opposite the flange 16. The cup-shaped receptacle 18 may be closed by a lid 19.

In the present case, the worm wheel 13 is pushed onto the end section 14 of the steering pinion 4 by means of a hub section 20 and is held on the pinion axially by means of a retaining element 21. In the exemplary mounting variant shown by way of example in FIG. 3, a bearing inner ring 22 of the second bearing 8 is also fixed to the steering pinion 4 via this axial retainer. A bearing outer ring 23 of the second bearing 8 may, for example, be fixed in the steering housing 15 by means of a shaft retaining ring 24.

A positive connection, for example in the form of a spline, may be furnished between the inner circumference of the hub section 20 of the worm wheel 13 and the outer circumference of the end section 14 of the steering pinion 4.

However, it is also possible to fasten the worm wheel 13 to the steering pinion 4 solely in a non-positive manner, such that the fastening slips when a predetermined torque is exceeded, so as to provide overload protection. For example, an appropriate preload may be applied with a suitable retaining element 21.

Figure 4:
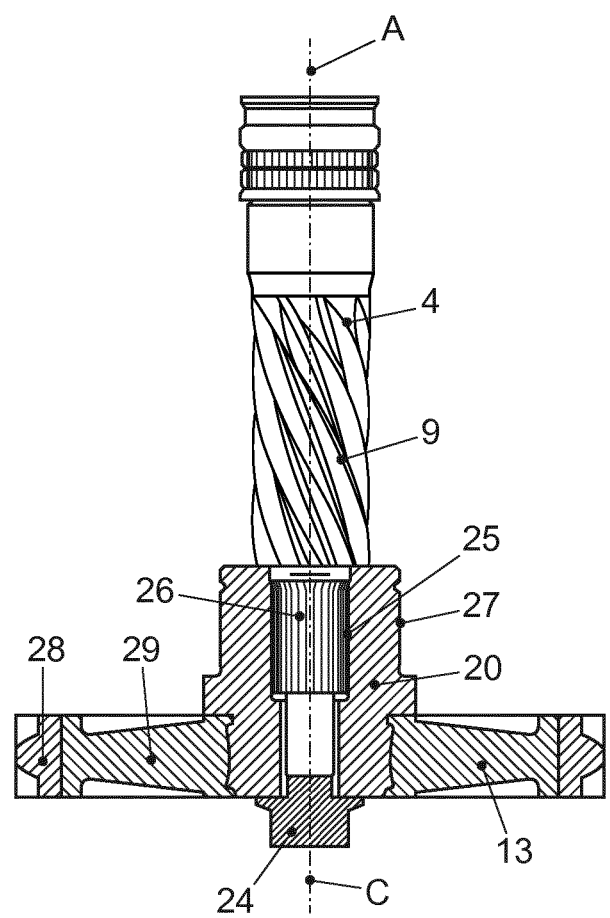

FIG. 4 shows a variant embodiment for fastening the worm wheel 13 to the steering pinion 4. Here, a hub section 20 of the worm wheel 13 has a gear section 25 on its inner circumference, which is axially pushed onto an external toothing 26 that is formed on the steering pinion 4. In the present case, a fastening screw serves as a retaining element 21, and is screwed into the front of the end section 14 of the steering pinion 4 and braces the hub section 20 against an abutment shoulder on the steering pinion 4. The hub section 20 may extend up to the gear section 9 of the steering pinion 4 and may also serve as the bearing inner ring of the second bearing 8 or may form a section 27 for fastening such a bearing inner ring 22.

A sprocket section 28 of the worm wheel 13 is connected to the hub section 20 via a connecting section 29. The aforementioned sections 20, 28 and 29 of the worm wheel 13 may be designed as a single unit. However, it is also possible to manufacture individual sections as separate components and connect them together later. As a result, different materials may be used for the individual sections 20, 28 and 29.

Figure 5:
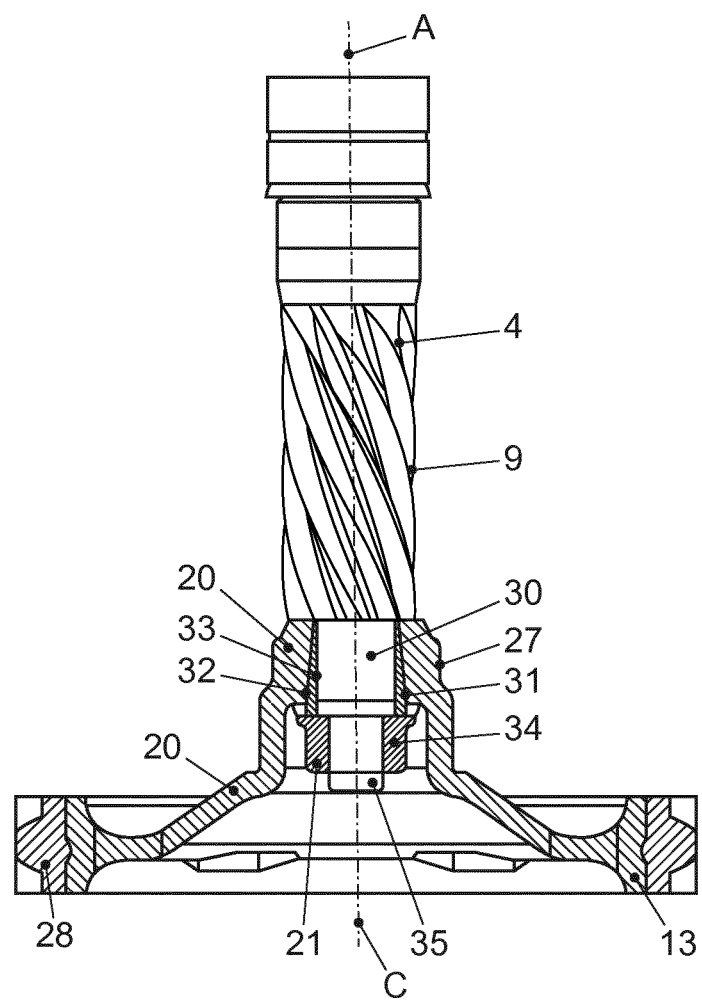
FIG. 5 Second variant embodiment for a steering pinion with a worm wheel fastened to it, FIG. 6 Third exemplary embodiment of an electromechanical motor vehicle steering system according to the invention, FIG. 7 Fourth exemplary embodiment of an electromechanical motor vehicle steering system according to the invention.

FIG. 5 shows another variant embodiment for fastening the worm wheel 13 to the steering pinion 4 using a purely non-positive connection.

The non-positive connection may, for example, be designed as a taper connection.

For this purpose, a cylindrical seat 30 may be formed at the end section of the steering pinion 4. On this seat 30 the hub section 20 of the worm wheel 13, as well as a taper sleeve 31, are pushed on. The taper sleeve 31 is centered on the outer circumference of the seat 30 and has a taper surface 32 on its outer circumference, which engages with a taper surface 33 on the inner circumference of the hub section 20. The two taper surfaces 32 and 33 are braced against each other by means of a retaining element 21 in the form of a fastening nut 34, which is screwed onto a threaded section 35 at the end of the steering pinion 4. Instead of a fastening nut 34, a fastening screw may also be used, likewise as in FIG. 4, just as an axial retention using a fastening nut 34 is possible in FIG. 4, analogously to FIG. 5.

Figure 6:
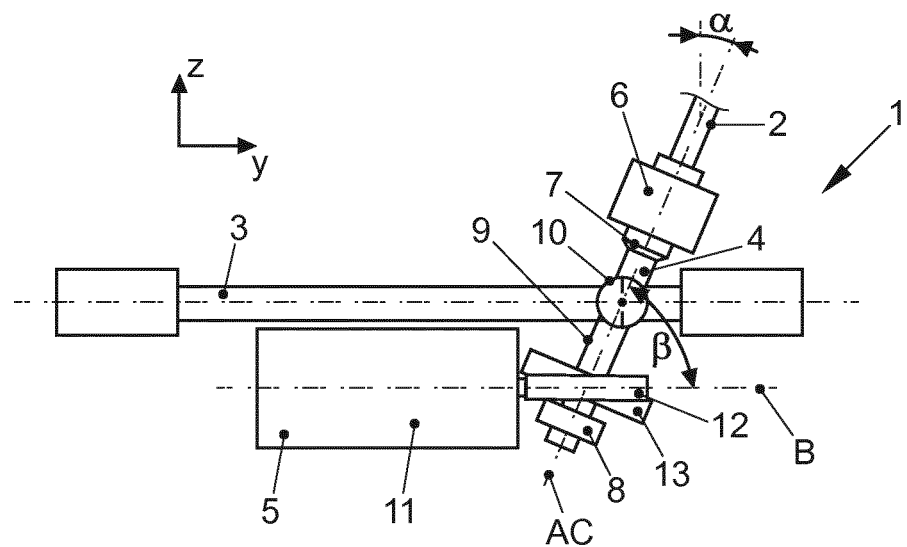

FIG. 6 shows, by way of a third exemplary embodiment, a further variation of the electromechanical motor vehicle steering systems described above. Here again, components corresponding to the first and second exemplary embodiments are given the same reference symbols.

In contrast to the above-described embodiments, in the third exemplary embodiment, both the gear section 9 of the steering pinion 4, which engages with the steering rack 3, and the worm wheel 13, are arranged between the two bearings 7 and 8.

Here again, the rotation axis B of the worm shaft 12 and the rotation axis C of the worm wheel 13 or rotation axis A of the steering pinion 4, enclose an intersection angle β in the range from 20° to 80°.

In addition, as above, it is possible in principle to arrange the electric drive device 5 in a horizontal plane below the steering rack 3 that contains the rotation axis B of the worm shaft 12, in a position that is pivoted relative to the position shown in FIG. 6, in which the rotation axis B runs parallel to the steering rack 3.

Figure 7:
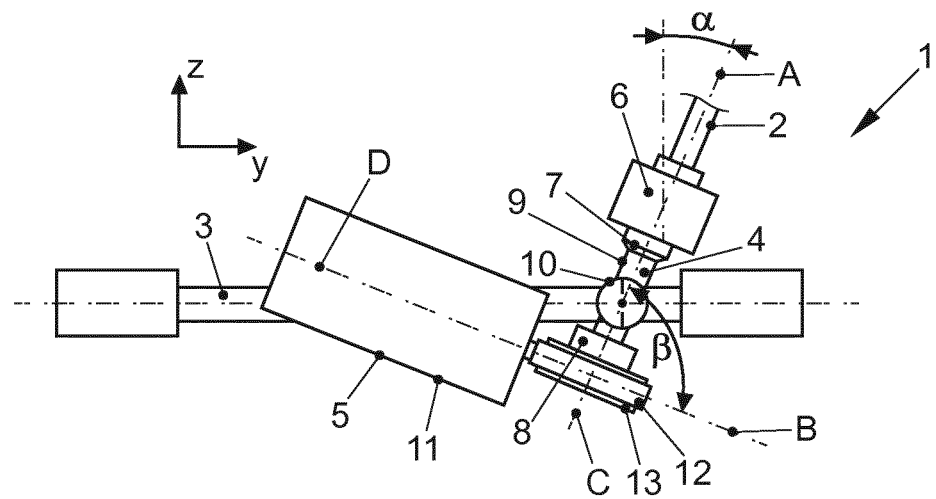

FIG. 7 shows another possible variation for arranging the electric drive device relative to the steering rack 3, in the context of a fourth exemplary embodiment. In this case, it is envisioned that the rotation axis B of the worm shaft 12 and the rotation axis C of the worm wheel 13 enclose an intersection angle β of 90°. However, in this case, the worm wheel 13 remains arranged on the side of the steering rack 3 that is opposite the steering column 2. In particular, in this case, the worm wheel 13 is located between the gear section 9 of the steering pinion 4 and the second bearing 8 at the end section 14 of the steering pinion 4. Correspondingly, the rotation axis D of the electric motor 11 is positioned at an angle unequal to zero relative to a horizontal plane xy.

Here in turn, it is possible to arrange the electric drive device 5, pivoted relative to the position shown in FIG. 7, in a plane to which the rotation axis C of the worm wheel 13 is perpendicular. This plane cuts the steering pinion 4 preferably below the steering rack 3 in the vertical direction.

The invention was explained above in greater detail with reference to exemplary embodiments and further modifications. The exemplary embodiments and modifications serve to demonstrate the invention's feasibility. Individual technical features that have been explained above in context the context of additional individual features, may also be implemented independently of these other features and in combination with other individual features, even if such a combination is not expressly described, as long as doing so is technically possible. The invention is therefore expressly not limited to the specifically-described exemplary embodiments and variations, but encompasses all the configurations defined by the Claims.

LIST OF REFERENCE SIGNS

1 Electromechanical motor vehicle steering system (steering system)
2 Steering column
3 Steering rack
4 Steering pinion
5 Electric drive device
6 Torque measuring device
7 First bearing
8 Second bearing
9 Gear section of steering pinion
10 Thrust piece
11 Electric motor
12 Worm shaft
13 Worm wheel
14 End section of steering pinion
15 Steering housing
16 Flange
17 Torsion bar
18 Cup-shaped receptacle
19 Lid
20 Hub section
21 Retaining element
22 Bearing inner ring
23 Bearing outer ring
24 Shaft retaining ring
25 Gear section
26 External toothing
27 Section for bearing mounting
28 Sprocket section
29 Connecting section
30 Seat
31 Taper sleeve
32 Taper surface
33 Taper surface
34 Fastening nut
35 Threaded section
A Rotation axis of steering pinion
B Rotation axis of worm shaft
C Rotation axis of worm wheel
D Rotation axis of electric motor
EPS Electric power steering=electric steering system
x Vehicle longitudinal direction
y Vehicle transverse direction
z Vertical direction (corresponds to vehicle height direction)

α Angle of the rotation axis A to the vertical direction for projection into the yz plane
β Angle of intersection between rotation axes B and C

The invention claimed is:

1. An electromechanical motor vehicle steering system, comprising:
   a steering column;
   a steering rack;
   a steering pinion disposed to couple said steering column to said steering rack; and
   an electric drive device with an electric motor and a worm wheel;
   said worm wheel of said electric drive device being arranged on said steering pinion, and said steering rack being disposed between said worm wheel and said steering column;
   a first bearing and a second bearing rotatably mounting said steering pinion in a steering housing, wherein a gear section of a steering pinion, which engages with said steering rack, as well as the worm wheel, are located between said first and second bearings.

2. The electromechanical motor vehicle steering system according to claim 1, wherein the worm wheel is mounted overhung at one end section of said steering pinion.

3. The electromechanical motor vehicle steering system according to claim 1, further comprising a first bearing and a second bearing rotatably mounting said steering pinion in a steering housing, wherein a gear section of said steering pinion, which engages with said steering rack, is located between said first and second bearings.

4. An electromechanical motor vehicle steering system, comprising:
   a steering column, a steering rack, and a steering pinion disposed to couple said steering column to said steering rack; and
   an electric drive device with an electric motor and a worm wheel;
   said worm wheel of said electric drive device being arranged on said steering pinion, and said steering rack being disposed between said worm wheel and said steering column;
   said electric drive device having a worm shaft that is drive-coupled to said electric motor and in engagement with said worm wheel, and a rotation axis of said worm shaft and a rotation axis of said worm wheel enclosing an intersection angle of 90°.

5. The electromechanical motor vehicle steering system according to claim 1, wherein said electric drive device has a worm shaft that is drive-coupled with said electric motor and in engagement with said worm wheel, and wherein a rotation axis of said worm shaft and a rotation axis of said worm wheel enclose an intersection angle in a range from 20° to 80°.

6. The electromechanical motor vehicle steering system according to claim 1, wherein said electric drive device has a worm shaft that is drive-coupled to said electric motor and in engagement with said worm wheel, and wherein a rotation axis of the worm shaft and a rotation axis of the worm wheel enclose an intersection angle of 90°.

7. The electromechanical motor vehicle steering system according to claim 1, wherein said electric motor has a rotation axis, and said worm shaft is coaxial with said rotation axis of said electric motor.

8. The electromechanical motor vehicle steering system according to claim 1, wherein, in an installed state of the motor vehicle steering system, said worm wheel is arranged below said steering rack in relation to a vertical direction.

9. The electromechanical motor vehicle steering system according to claim 1, wherein, in an installed state of the motor vehicle steering system, said electric motor is arranged below said steering rack in relation to a vertical direction.

10. The electromechanical motor vehicle steering system according to claim 1, wherein said electric motor has a rotation axis that is parallel to said steering rack.

11. The electromechanical motor vehicle steering system according to claim 1, wherein said worm wheel is non-positively fastened to said steering pinion and wherein a connection therebetween is configured to slip when a pre-determined torque is exceeded, so as to provide overload protection.

12. The electromechanical motor vehicle steering system according to claim 4, further comprising a first bearing and a second bearing rotatably mounting said steering pinion in a steering housing, wherein a gear section of a steering pinion, which engages with said steering rack, as well as the worm wheel, are located between said first and second bearings.

13. An electromechanical motor vehicle steering system, comprising:
   a steering column, a steering rack, and a steering pinion disposed to couple said steering column to said steering rack; and
   an electric drive device with an electric motor and a worm wheel;
   said worm wheel of said electric drive device being arranged on said steering pinion, and said steering rack being disposed between said worm wheel and said steering column; and
   said electric motor having a rotation axis that is parallel to said steering rack.

* * * * *